(12) United States Patent
Xu

(10) Patent No.: US 7,450,375 B2
(45) Date of Patent: Nov. 11, 2008

(54) MOUNTING APPARATUS FOR STORAGE DEVICE

(75) Inventor: Ji-Guo Xu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 541 days.

(21) Appl. No.: 11/200,828

(22) Filed: Aug. 10, 2005

(65) Prior Publication Data

US 2006/0034048 A1    Feb. 16, 2006

(30) Foreign Application Priority Data

Aug. 11, 2004    (CN)   ............ 2004 2 0828907 U

(51) Int. Cl.
*G06F 1/16* (2006.01)
(52) U.S. Cl. .................................................. 361/685
(58) Field of Classification Search .................. 361/685
See application file for complete search history.

(56) References Cited

U.S. PATENT DOCUMENTS

| | | | | |
|---|---|---|---|---|
| 4,713,714 A * | 12/1987 | Gatti et al. | ............... | 360/137 |
| 5,262,923 A | 11/1993 | Batta et al. | ............... | 361/685 |
| 5,599,080 A | 2/1997 | Ho | ............... | 312/334.7 |
| 5,683,159 A | 11/1997 | Johnson | ............... | 312/334.7 |
| 5,687,059 A * | 11/1997 | Hoppal | ............... | 361/685 |
| 5,734,557 A | 3/1998 | McAnally et al. | ............... | 361/727 |
| 5,995,365 A * | 11/1999 | Broder et al. | ............... | 361/685 |
| 6,069,789 A * | 5/2000 | Jung | ............... | 361/684 |
| 6,130,817 A * | 10/2000 | Flotho et al. | ............... | 361/685 |
| 6,166,901 A * | 12/2000 | Gamble et al. | ............... | 361/685 |
| 6,385,036 B1 | 5/2002 | Chien | ............... | 361/683 |
| 6,396,686 B1 * | 5/2002 | Liu et al. | ............... | 361/685 |
| 6,421,236 B1 * | 7/2002 | Montoya et al. | ............... | 361/685 |
| 6,498,722 B1 * | 12/2002 | Stolz et al. | ............... | 361/685 |
| 6,600,648 B2 * | 7/2003 | Curlee et al. | ............... | 361/685 |
| 6,914,778 B2 * | 7/2005 | Deckers et al. | ............... | 361/685 |

* cited by examiner

*Primary Examiner*—Lisa Lea-Edmonds
(74) *Attorney, Agent, or Firm*—Morris Manning & Martin; Tim Tingkang Xia, Esq.

(57) ABSTRACT

A mounting apparatus includes a bracket (20), a slidable member (40), a retention member (50), and a pair of shock absorbers (80). The bracket is for receiving a storage device (10) therein, the bracket including a pair of opposite first and second sidewalls (24, 26), and a pair of through holes (246) is defined in the first sidewall. The slidable member is movably attached to the first sidewall of the bracket. The retention member is spring-loaded, and is movable relative to the slidable member and the first sidewall respectively in different directions. A pair of latches (54) is formed on the retention member, the latches being capable of being extended through the through holes respectively for engaging the storage device. The shock absorber is arranged to an internal surface of the second sidewall for engaging the storage device.

20 Claims, 4 Drawing Sheets

MOUNTING APPARATUS FOR STORAGE DEVICE

CROSS-REFERENCE TO RELATED APPLICATIONS

Relevant subject matter is disclosed in a U.S. patent application entitled "MOUNTING APPARATUS FOR STORAGE DEVICES", assigned to the same assignee of this application with an application Ser. No. 10/951,425.

BACKGROUND OF THE INVENTION

1. Field of the Invention

The present invention relates to a mounting apparatus, and more particularly to a mounting apparatus for a storage device.

2. General Background

The manufacture and assembly of electronic apparatuses has become increasingly more competitive. Manufacturers continually strive to improve the design and features of electronic apparatuses yet still offer competitive prices. One such area of improvement is mounting of devices in an electronic apparatus. An electronic apparatus, such as a typical desktop computer, tower, server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

For instance, as disclosed in China Patent No. 92232515.4 and China Laid-open Application No. 01130712.9, the installation of a hard disk drive in a computer typically involves use of screws to attach the hard disk drive to a bracket of a computer chassis. Usually, these screws are small enough making them difficult to manipulate and install. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

Another improved type of mounting apparatus without use of screws is disclosed in U.S. Pat. No. 5,599,080, which teaches a pair of mounting rails each having two horizontal projecting plug rods plugged into respective mounting holes in a storage device. An outward hook is formed on a front extension strip of each rail, for engagement with a respective retaining hole of a bracket to securely attach the storage device in the bracket. The extension strips are depressed inward to release the outward hooks from respective retaining holes, and therefore the storage device is able to be removed from the bracket. However, the storage device is apt to be unwillingly detached from the bracket due to inadvertently depressing the extension strips.

As manufacturers focus on designing mounting apparatus that facilitates installing a storage device, shock problem that the storage device may encounter when the electronic apparatus falls over is improperly neglected.

What is desired, therefore, is a mounting apparatus which conveniently and securely holds a device in place and additionally prevents shock.

SUMMARY

In one preferred embodiment, a mounting apparatus includes a bracket, a slidable member, a retention member, and a shock absorber. The bracket is for receiving a storage device therein, the bracket including first and second sidewalls, and a pair of through holes is defined in the first sidewall. The slidable member is movably attached to the first sidewall of the bracket. The retention member is spring-loaded, and is movable relative to the slidable member and the first sidewall respectively in different directions. A pair of latches is formed on the retention member, the latches being capable of being extended through the through holes respectively for engaging the storage device. The shock absorber is arranged to an internal surface of the second sidewall for engaging the storage device.

Other advantages and novel features will become more apparent from the following detailed description of preferred embodiments when taken in conjunction with the accompanying drawings, in which:

DETAILED DESCRIPTION OF THE INVENTION

Figure 1:
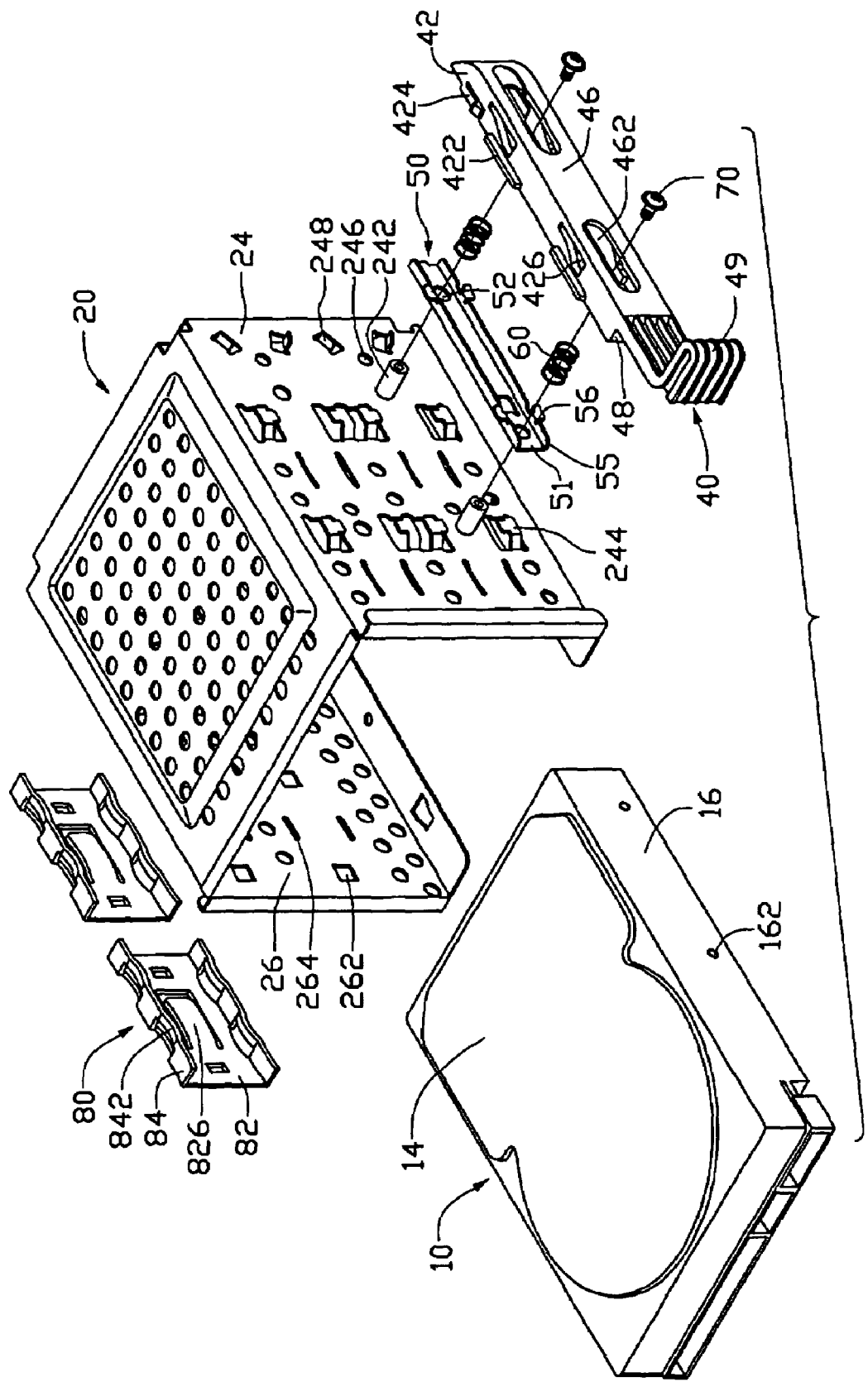
FIG. 1 is an exploded, isometric view of a mounting apparatus and a storage device in accordance with a preferred embodiment of the present invention.
Figure 2:
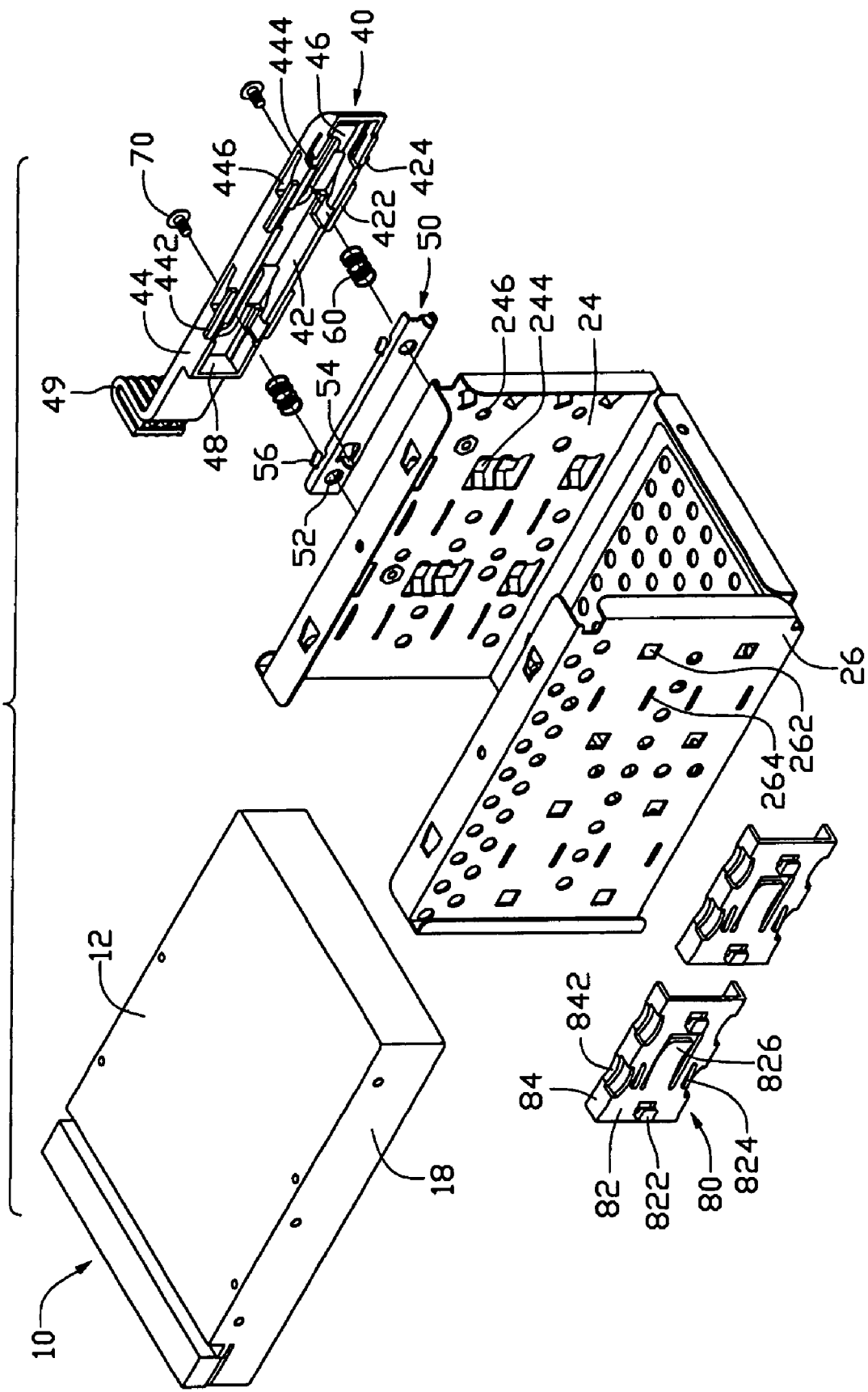
FIG. 2 is similar to FIG. 1, but viewed from another aspect.

Referring to FIGS. 1 and 2, in a preferred embodiment of the invention, a mounting apparatus of an electronic device like a computer is provided for holding a functional device like a storage device 10 of the computer in place. The mounting apparatus includes a bracket 20, a slidable member 40, a retention member 50, and a pair of shock absorbers 80.

The storage device 10 includes a top wall 14, a bottom wall 12, and a pair of sidewalls 16, 18, and two holes 162 are defined in the side wall 16.

The bracket 20 includes a pair of opposite first and second sidewalls 24, 26. Two horizontally spaced projections 242 are formed on an outer surface of the first sidewall 24, each projection 242 defining an internal threaded hole. A pair of retaining pieces 244 is punched outwardly from the first sidewall 24 and is generally located below the projections 242. Another pair of retaining pieces 244 is located above the projections 242. A pair of through holes 246 is defined in the first sidewall 24 adjacent the projections 242 respectively, corresponding to the holes 162 of the storage device 10. A pair of slanted tabs 248 is formed adjacent a front end of the first sidewall 24. Four horizontally spaced apertures 262 are defined in the second sidewall 26, and four slots 264 are defined in the second sidewall 26 in cooperation with the apertures 262 to fix the shock absorbers 80.

The slidable member 40 is generally box-shaped. The slidable member 40 includes a vertical wall 46. A pair of spaced apertures 462 is defined in the vertical wall 46. A pair of horizontal walls 42, 44 is extended inwardly from upper and lower edges of the vertical wall 46 respectively. A pair of spaced rails 422 is formed outwardly on the horizontal wall 42. A resilient hook 424 is formed from adjacent an end of the horizontal wall 42. A pair of arcuate slideways 426 is defined in the horizontal wall 42. Each slideway 426 includes a pair of flat end portions and a generally sloped middle portion connecting between the end portions. A pair of spaced rails 442 is formed outwardly on the horizontal wall 44. The rails 422, 442 correspond to the retaining pieces 244 of the bracket 20. A resilient hook 444 is formed from adjacent an end of the horizontal wall 44, near the end of the horizontal wall 42. The hooks 424, 444 correspond to the tabs 248 of the bracket 20. A pair of arcuate slideways 446 is defined in the horizontal wall 44. Each slideway 446 includes a pair of flat end portions and a generally sloped middle portion connecting between the end portions. A knob 49 is formed from an end wall 48 of the slidable member 40.

The retention member 50 includes a rectangular plate 51, and a pair of flanges 55 extended perpendicularly outwardly from upper and lower edges of the plate 51 respectively. A pair of holes 52 is defined in the plate 51 corresponding to the projections 242 of the bracket 20. A pair of latches 54 is formed inward from the plate 51 corresponding to the holes 162 of the storage device 10. A pair of sliding portions 56 is formed on each flange 55, corresponding to the slideways 426, 446 of the slidable member 40.

A pair of fasteners such as screws 70 is provided to attach a pair of resilient members such as coil springs 60 to the retention member 50.

Each shock absorber 80 includes a first wall 82 and a pair of second walls 84 extending from top and bottom edges of the first wall 82. A pair of catches 822 is formed on an external surface of the first wall 82. A pair of protrusions 824 is arranged on the external surface of the first wall 82. An arcuate first spring piece 826 is formed integrally from the first wall 82 between the catches 822 and the protrusions 824, corresponding to the sidewall 18 of the storage device 10. A pair of arcuate second spring pieces 842 is formed integrally from each second wall 84, corresponding to the top and bottom walls 14, 12 of the storage device 10.

Figure 3:
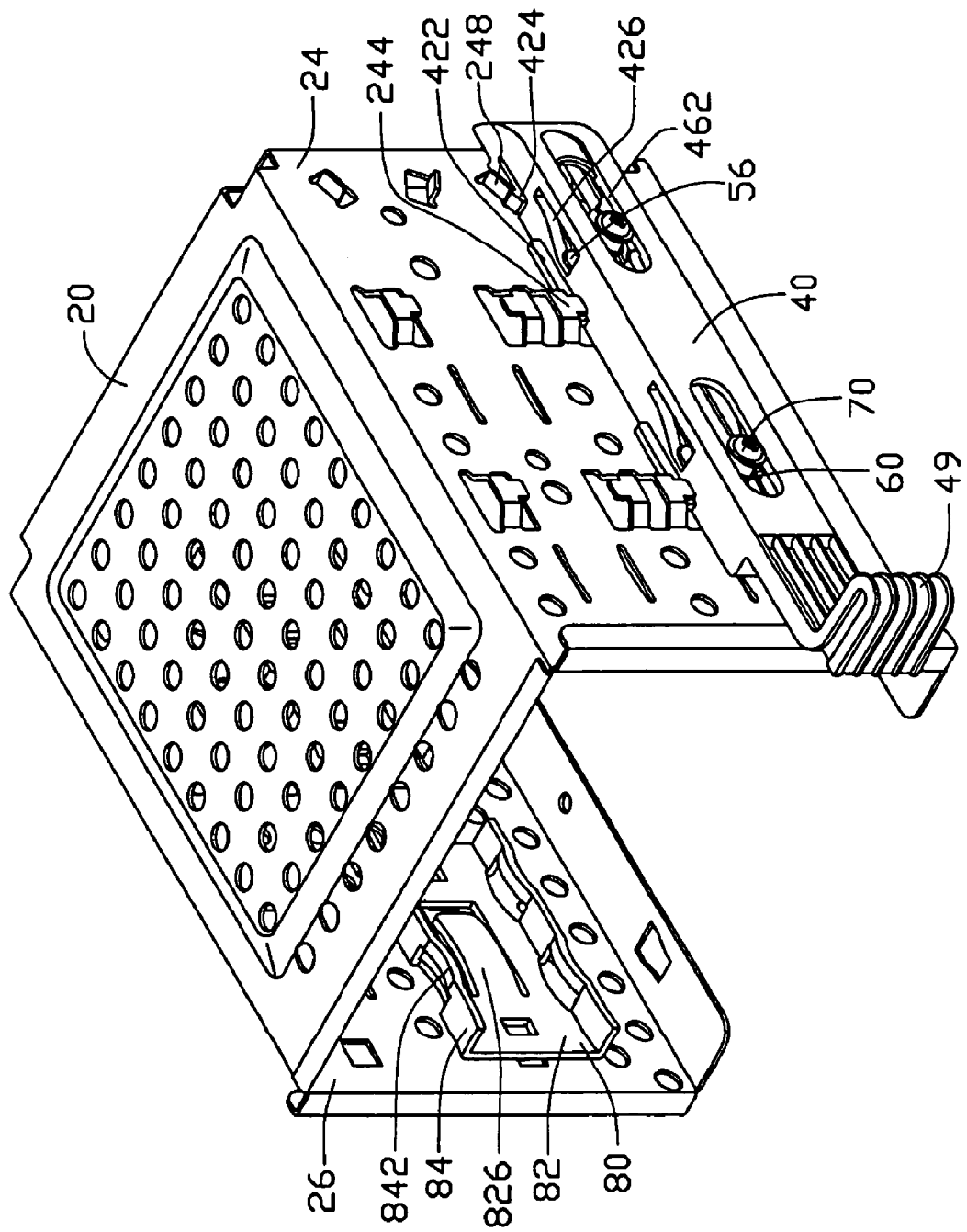
FIG. 3 is an assembled view of the mounting apparatus of FIG. 1.

Referring to FIG. 3, in assembly of the mounting apparatus, the retention member 50 is engaged to the first sidewall 24 of the bracket 20, with the latches 54 aligning with corresponding through holes 246 of the bracket 20. The projections 242 extend through the holes 52 of the retention member 50 respectively. The screws 70 are engaged in the projections 242 respectively to attach the coil springs 60 between the plate 51 of the retention member 50 and the screws 70. Each projection 242 extends through corresponding coil spring 60. The slidable member 40 is placed on the first sidewall 24, with the projections 242 in alignment with the apertures 462 of the slidable member 40 respectively. The sliding portions 56 of the retention member 50 are received in the slidable member 40 adjacent the slideways 426, 446 respectively. The hooks 424, 444 of the slidable member 40 are located at the front of the tabs 248 of the bracket 20 respectively. The slidable member 40 is moved toward a rear end of the first sidewall 24 of the bracket 20 until the rails 422, 442 engage the retaining pieces 244 of the bracket 20 respectively. The hooks 424, 444 are moved through between the tabs 248. The sliding portions 56 engage the slideways 426, 446 respectively.

The shock absorbers 80 are attached to an internal surface of the second sidewall 26 of the bracket 20. The protrusions 824 of the shock absorbers 80 are received in the slots 264 of the second sidewall 26 respectively, and the catches 822 of the shock absorbers 80 extend through the apertures 262 of the second sidewall 26 respectively and engage an external surface of the second sidewall 26.

Figure 4:
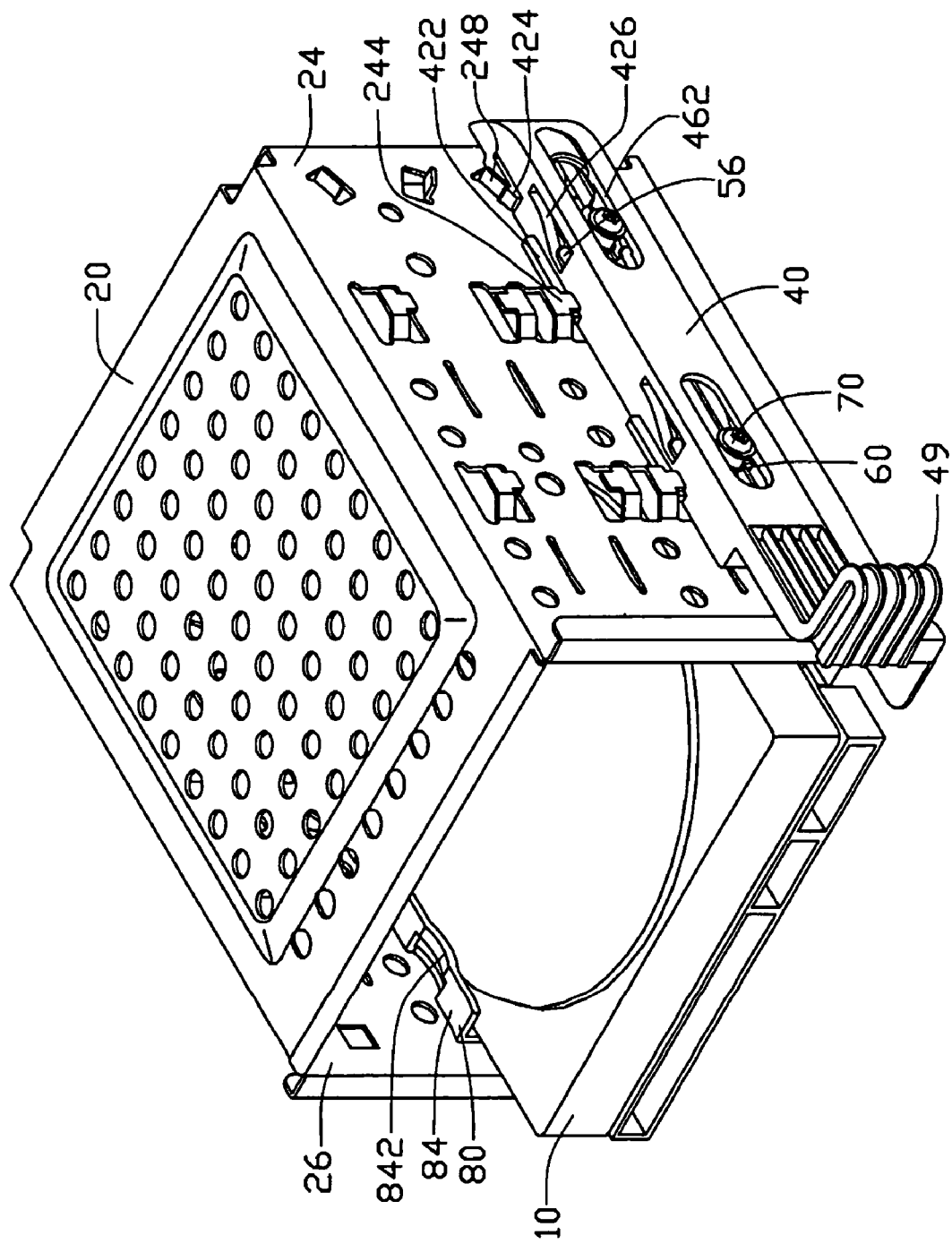
FIG. 4 is an assembled view of FIG. 1, showing the storage device is held in place.

In use of the mounting apparatus, FIG. 4 shows the storage device 10 is fixed in the bracket 20 along a moving direction parallel to the second sidewall 26 from front to back. The latches 54 of the retention member 50 engage the holes 162 of the sidewall 16 of the storage device 10 through the through holes 246 of the bracket 20. The coil springs 60 engage the retention member 50 for preventing the latches 54 withdrawing from the storage device 10. The first spring pieces 826 engage the sidewall 18 of the storage device 10 and are capable of damping vibrations of the storage device 10 along a lateral directions of the storage device 10, and the second spring pieces 842 engage the top and bottom walls 14, 12 respectively and are capable of damping up and down vibrations and lateral vibrations of the storage device 10.

To detach the storage device 10, the knob 49 is gripped to pull the slidable member 40 toward the rear end of the first sidewall 24 of the bracket 20. The sliding portions 56 of the retention member 50 are relatively slid along the slideways 426, 446 of the slidable member 40, the retention member 50 is pushed away from the first sidewall 24 by the slideways 426, 446, and the latches 54 of the retention member 50 are withdrawn from the holes 162 of the storage device 10. The coil springs 60 are compressed. The storage device 10 is ready to be detached from the bracket 20. When the slidable member 40 is pushed toward the front end of the first sidewall 24, the retention member 50 is relatively slid along the slideways 426, 446 of the slidable member 40, and the coil springs 60 are restored to push the retention member 50 toward the first sidewall 24. The latches 54 are extended in the bracket 20 through corresponding through holes 246 of the first sidewall 24.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for a storage device, comprising:
    a bracket for receiving the storage device, the bracket comprising first and second sidewalls, a pair of through holes being defined in the first sidewall;
    a slidable member movably attached to the first sidewall of the bracket;
    a spring-loaded retention member being movable relative to the slidable member and the first sidewall respectively in different directions, a pair of latches formed on the retention member, the latches being capable of being extended through the through holes respectively for engaging the storage device; and
    a shock absorber arranged to an internal surface of the second sidewall for engaging the storage device.

2. The mounting apparatus as claimed in claim 1, wherein two resilient members are provided to urge the retention member toward the first sidewall.

3. The mounting apparatus as claimed in claim 2, wherein each of the resilient members is a coil spring.

4. The mounting apparatus as claimed in claim 3, wherein two projections are formed on the first sidewall, two holes are defined in the retention member, the projections extend through the holes and the coil springs respectively, and two fasteners are provided to engage the projections respectively to attach the coils springs between the fasteners and the retention member.

5. The mounting apparatus as claimed in claim 1, wherein a pair of arcuate slideways is defined in the slidable member, a pair of sliding portions is formed on the retention member relatively sliding along the slideways respectively.

6. The mounting apparatus as claimed in claim 1, wherein at least two vertically spaced retaining pieces are formed on the first sidewall, and at least two rails are formed on the slidable member engaging said retaining pieces to guide sliding of the slidable member along the first sidewall.

7. The mounting apparatus as claimed in claim 1, wherein the shock absorber comprises a first wall and a pair of second walls extending from top and bottom edges of the first wall, and an arcuate spring piece is formed from at least one of the first and second walls for engaging the storage device.

8. The mounting apparatus as claimed in claim 7, wherein an aperture is defined in the second sidewall of the bracket, and a catch is formed on the first wall of the shock absorber extending through the aperture and engaging an external surface of the second sidewall.

9. The mounting apparatus as claimed in claim 8, wherein a slot is defined in the second sidewall of the bracket, and a protrusion is formed on the first wall of the shock absorber engaging in the slot of the second sidewall.

10. A mounting apparatus comprising:
   a bracket for receiving a device therein, the bracket comprising first and second sidewalls, a pair of through holes being defined in the first sidewall;
   a slidable member being slidable along the first sidewall of the bracket, a pair of arcuate slideways formed in the slidable member;
   a spring-loaded retention member being relatively movable along the slideways of the slidable member, a pair of latches formed on the retention member in alignment with the through holes of the first sidewall for engaging the device, the retention member being capable of being moved toward the second sidewall; and
   a shock absorber associated with an internal surface of the second sidewall for engaging the device.

11. The mounting apparatus as claimed in claim 10, wherein two resilient members are provided to urge the retention member toward the first sidewall.

12. The mounting apparatus as claimed in claim 11, wherein each of the resilient members is a coil spring.

13. The mounting apparatus as claimed in claim 12, wherein two projections are formed on the first sidewall, two holes are defined in the retention member, the projections extend through the holes and the coil springs respectively, and two fasteners are provided to engage the projections respectively to attach the coils springs between the fasteners and the retention member.

14. The mounting apparatus as claimed in claim 10, wherein the slidable member comprises a pair of horizontal walls, and the slideways are formed in the horizontal walls respectively.

15. The mounting apparatus as claimed in claim 14, wherein each of the slideways comprises a pair of flat end portions and a generally sloped middle portion connecting between the end portions, and a pair of sliding portions is formed on the retention member relatively sliding along the slideways respectively.

16. The mounting apparatus as claimed in claim 10, wherein the shock absorber comprises a first wall and a pair of second walls extending from top and bottom edges of the first wall, and an arcuate spring piece is formed from at least one of the first and second walls for engaging the storage device.

17. The mounting apparatus as claimed in claim 10, wherein at least two vertically spaced retaining pieces are formed on the first sidewall, and at least two rails are formed on the slidable member engaging said retaining pieces to guide sliding of the slidable member along the first sidewall.

18. An electronic device comprising:
   a functional device performing a predetermined function for said electronic device, and movable into and out of said electronic device;
   a bracket disposed in said electronic device to define a space therein for receiving said functional device when said functional device moves into said electronic device;
   a retention member movably attachable to said bracket and capable of securing said functional device in said bracket when said functional device moves into said space; and
   at least one shock absorber attachable to said bracket to resiliently engage with said functional device along at least a first direction and a second direction different from said first direction, said at least one shock absorber capable of damping vibrations onto said functional device along said first direction by resilient engagement thereof with said functional device, and capable of damping vibrations onto said functional device along said second direction by resilient engagement thereof with said functional device incorporating with said retention member.

19. The electronic device as claimed in claim 18, wherein a moving direction of said functional device into said space is perpendicular to said first and second directions.

20. The electronic device as claimed in claim 18, wherein a first spring piece is formed from said at least one shock absorber and engages a sidewall of said functional device to be capable of damping vibrations of said functional device along said second direction, and a pair of second opposite spring pieces is formed from said at least one shock absorber and respectively engage top and bottom walls of said functional device to be capable of damping vibrations of said functional device along said first direction.

* * * * *